US012768396B2

(12) United States Patent
Lin et al.

(10) Patent No.: US 12,768,396 B2
(45) Date of Patent: *Oct. 20, 2026

(54) HINGE WITH MOVABLE ROTATING AXLE

(71) Applicant: FOSITEK CORPORATION, New Taipei City (TW)

(72) Inventors: Chun-Han Lin, New Taipei City (TW); Yung-Chih Tseng, New Taipei City (TW); Zoen Ryon Ryan Wong, New Taipei City (TW)

(73) Assignee: FOSITEK CORPORATION, New Taipei City (TW)

( * ) Notice: Subject to any disclaimer, the term of this patent is extended or adjusted under 35 U.S.C. 154(b) by 366 days.

This patent is subject to a terminal disclaimer.

(21) Appl. No.: 18/428,543

(22) Filed: Jan. 31, 2024

(65) Prior Publication Data

US 2025/0188984 A1 Jun. 12, 2025

(30) Foreign Application Priority Data

Dec. 8, 2023 (TW) ................................ 112147894

(51) Int. Cl.
*F16C 11/04* (2006.01)
*G06F 1/16* (2006.01)

(52) U.S. Cl.
CPC ............ *F16C 11/04* (2013.01); *G06F 1/1681* (2013.01)

(58) Field of Classification Search
CPC ........... E05D 3/02; E05D 3/022; E05D 5/121; E05D 11/087; E05D 11/081; E05D 11/1028; G06F 1/1681; E05Y 2999/00; F16C 11/04
See application file for complete search history.

(56) References Cited

U.S. PATENT DOCUMENTS

| | | | | |
|---|---|---|---|---|
| 9,720,447 B2 * | 8/2017 | In-Sung | ................ | G06F 1/1618 |
| 9,823,706 B2 * | 11/2017 | Chen | ..................... | G06F 1/1613 |
| 10,362,706 B2 * | 7/2019 | Sun | ......................... | F16C 11/04 |
| 10,564,682 B1 * | 2/2020 | Wu | ....................... | G06F 1/1652 |
| 10,781,850 B2 * | 9/2020 | Hsu | ......................... | F16C 11/04 |
| 10,901,467 B2 * | 1/2021 | Kim | ...................... | G06F 1/1616 |
| 12,421,775 B2 * | 9/2025 | Lin | ....................... | G06F 1/1681 |
| 2006/0185126 A1 * | 8/2006 | Su | ......................... | G06F 1/1616 16/340 |
| 2006/0200945 A1 * | 9/2006 | Lu | ......................... | G06F 1/1616 16/340 |
| 2021/0064084 A1 * | 3/2021 | Lin | ....................... | G06F 1/1681 |
| 2025/0142749 A1 * | 5/2025 | Noh | ...................... | G06F 1/1652 |

FOREIGN PATENT DOCUMENTS

CN 104314968 A * 1/2015

* cited by examiner

*Primary Examiner* — Matthew R Mcmahon
(74) *Attorney, Agent, or Firm* — Burris Law, PLLC

(57) ABSTRACT

A hinge connectable between a first device part and a second device part includes a base seat unit and a rotating unit. The base seat unit includes first and second base seats for connecting with the first and second device parts, respectively. A first base plate of the first base seat is formed with a moving slot having a first slot portion and a second slot portion. The rotating unit includes a rotating axle movably extending through the moving slot and rotated with the second base seat, and a cam piece rotated with the rotating axle. During rotation of the rotating axle and the cam piece with the second base seat, a first protrusion of the cam piece is moved along a lower edge of the first slot portion to bring the rotating axle into upward movement.

5 Claims, 11 Drawing Sheets

HINGE WITH MOVABLE ROTATING AXLE

CROSS-REFERENCE TO RELATED APPLICATION

This application claims priority to Taiwanese Patent Application No. 112147894, filed on Dec. 8, 2023, and incorporated by reference herein in its entirety.

FIELD

The disclosure relates to a hinge for an electronic device, and more particularly to a hinge with a movable rotating axle.

BACKGROUND

Electronic devices, such as laptop computers utilize a hinge with a fixed rotating axle to connect an upper cover and a housing shell in order to open and close the upper cover relative to the housing shell. One of the upper cover and the housing shell is formed with a chamfer to avoid the upper cover and the housing shell interfering with each other when the upper cover is turned relative to the housing shell. However, there is no clearance therebetween during opening of the upper cover, which adversely affects heat dissipation.

SUMMARY

Therefore, an object of the disclosure is to provide a hinge that can alleviate at least one of the drawbacks of the prior art.

According to the disclosure, the hinge connectable between a first device part and a second device part to permit the second device part to rotate relative to the first device part includes a base seat unit and a rotating unit. The base seat unit includes a first base seat for connecting with the first device part, and a second base seat for connecting with the second device part. The first base seat has a first base plate. The first base plate has a first side, a second side opposite to the first side, an upper side and a lower side opposite to the upper side. The first base plate is formed with a moving slot which has a first slot portion that extends from the first side toward the second side, and a second slot portion that is in communication with the first slot portion and that extends from the first slot portion toward the upper side. The rotating unit includes a rotating axle which movably extends through the moving slot and which is securely connected with the second base seat so as to be rotated with the second base seat, and a cam piece which is securely mounted on the rotating axle. The cam piece has a cam surrounding portion which is securely sleeved on the rotating axle, and a first protrusion which projects radially from the cam surrounding portion and which is movably disposed in the first slot portion. The second base seat is driven to rotate the rotating unit between an initial position, where the rotating axle is located in the first slot portion and the first protrusion of the cam piece is located in the first slot portion adjacent to the first side, and a first rotating position. During rotation of the rotating axle and the cam piece with the second base seat, the first protrusion of the cam piece abuts against and is moved along a lower edge of the first slot portion to bring the rotating axle into upward movement to the second slot portion so as to move the rotating unit to the first rotating position.

With the second base seat driven to rotate with the rotating axle and the cam piece, and with the first protrusion of the cam piece abutting against and moved along the lower edge of the first slot portion, the rotating axle is moved upwardly to the second slot portion so as to move the rotating unit to the first rotating position. At this stage, the rotating axle is raised to create more clearance between the second device part and the first device part. Thus, interference of the second device part with the first device part during the rotation is avoided.

BRIEF DESCRIPTION OF THE DRAWINGS

Other features and advantages of the disclosure will become apparent in the following detailed description of the embodiments with reference to the accompanying drawings. It is noted that various features may not be drawn to scale.

DETAILED DESCRIPTION

Figure 1:
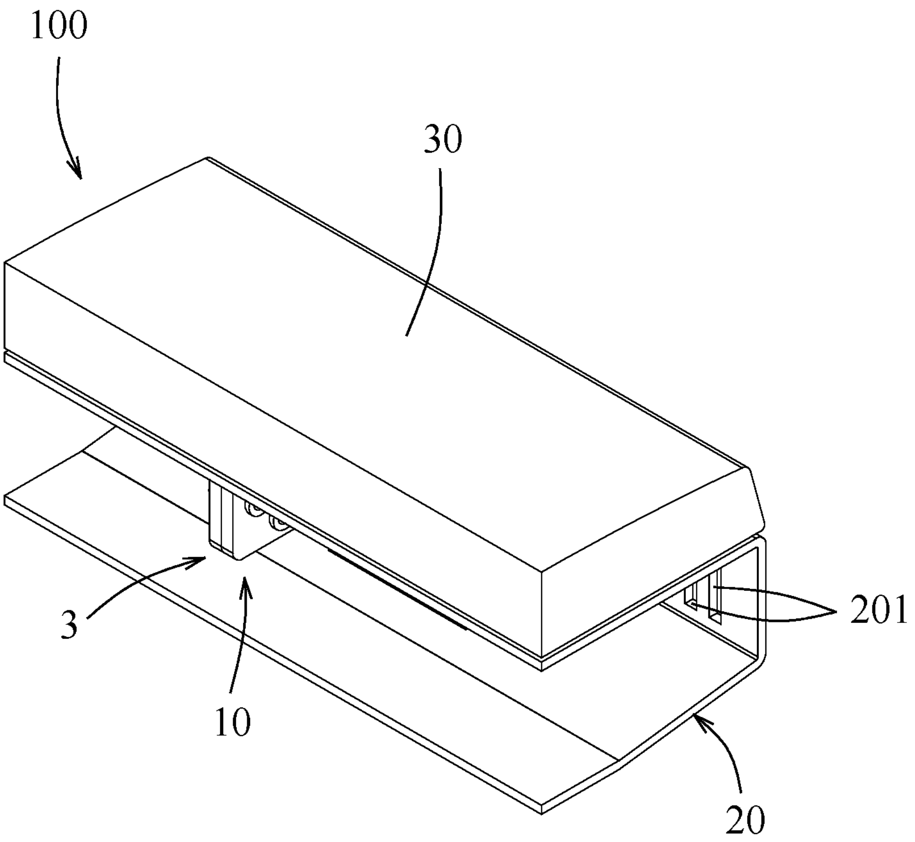
FIG. 1 is a perspective view illustrating an embodiment of a hinge according to the disclosure disposed on an electronic device and in a state when a rotating unit of the embodiment is in an initial position.
Figure 2:
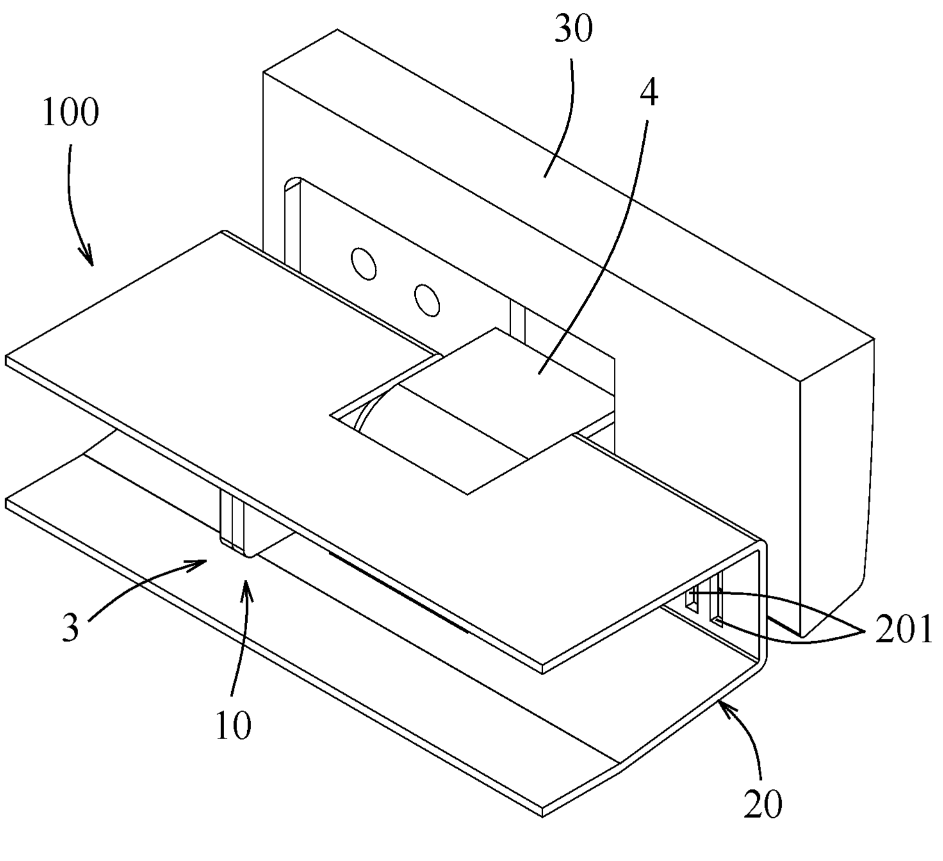
FIG. 2 is a perspective view similar to FIG. 1, illustrating the rotating unit in a first rotating position.
Figure 3:
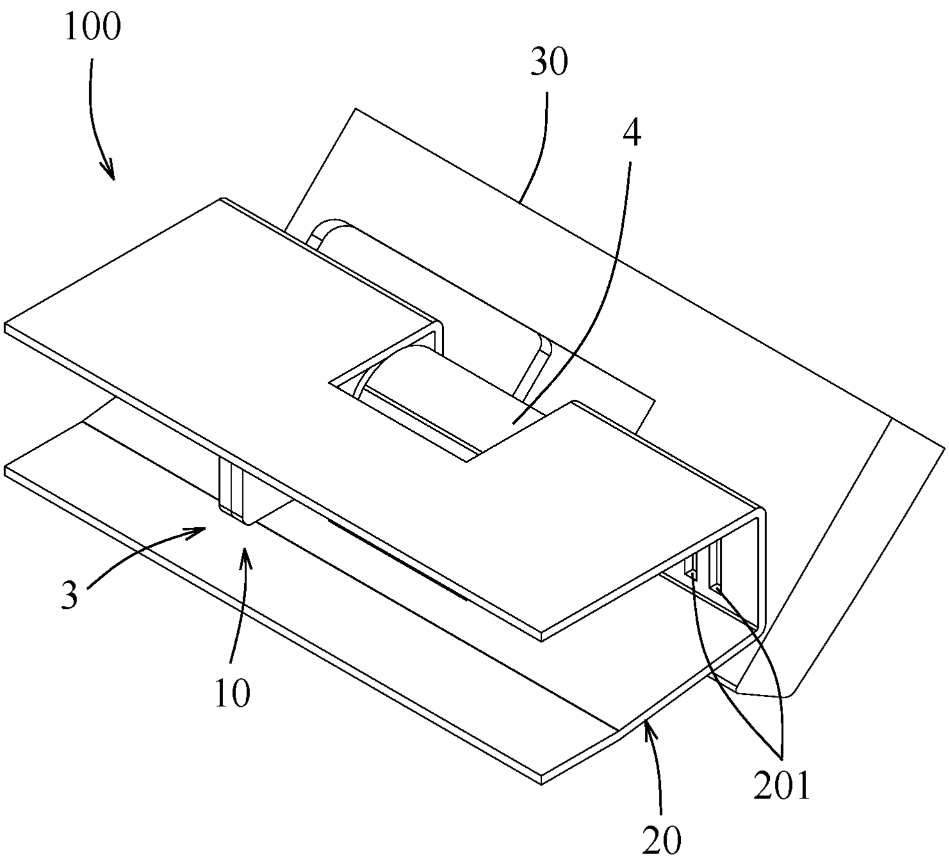
FIG. 3 is a perspective view similar to FIG. 1, illustrating the rotating unit in a second rotating position.

It should be noted herein that for clarity of description, spatially relative terms such as “top,” “bottom,” “upper,” “lower,” “on,” “above,” “over,” “downwardly,” “upwardly” and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIGS. 1 to 4, an embodiment of a hinge 10 according to the disclosure is connectable between a first device part 20 and a second device part 30 of an electronic device 100 to permit the second device part 30 to rotate relative to the first device part 20. For example, the electronic device 100 may be a foldable mobile phone, tablet, tablet PC, or portable PC, or so forth. The electronic device 100 is a tablet PC in this embodiment, and the first device part 20 is a part of a portion on which a keyboard or a sub-screen is disposed, and has a plurality of heat dissipating holes 201. The second device part 30 is a part of a main screen. The hinge 10 includes a base seat unit 1 and a rotating unit 2.

Figure 4:
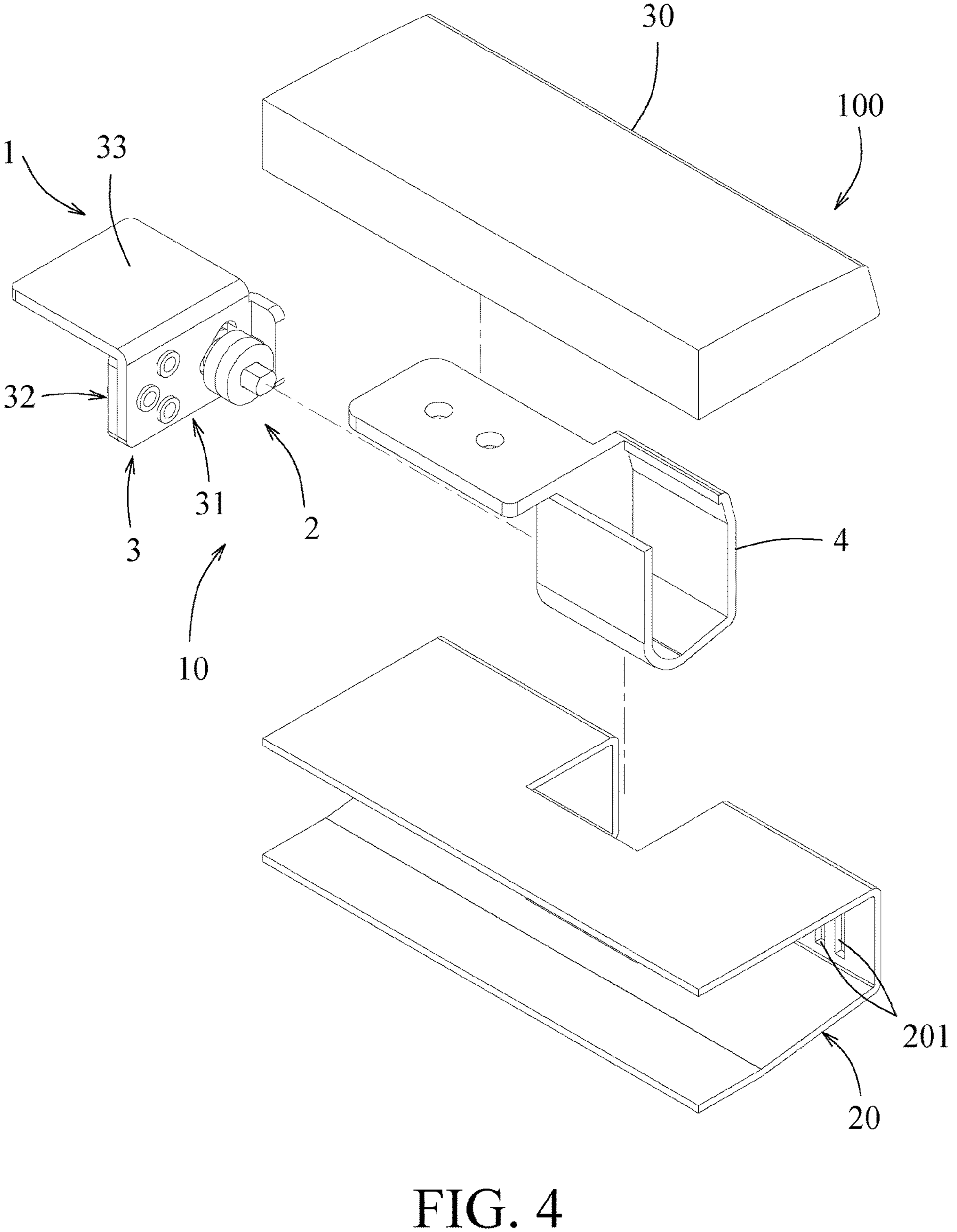
FIG. 4 is an exploded perspective view of the embodiment disposed between a first device part and a second device part of an electronic device.
Figure 5:
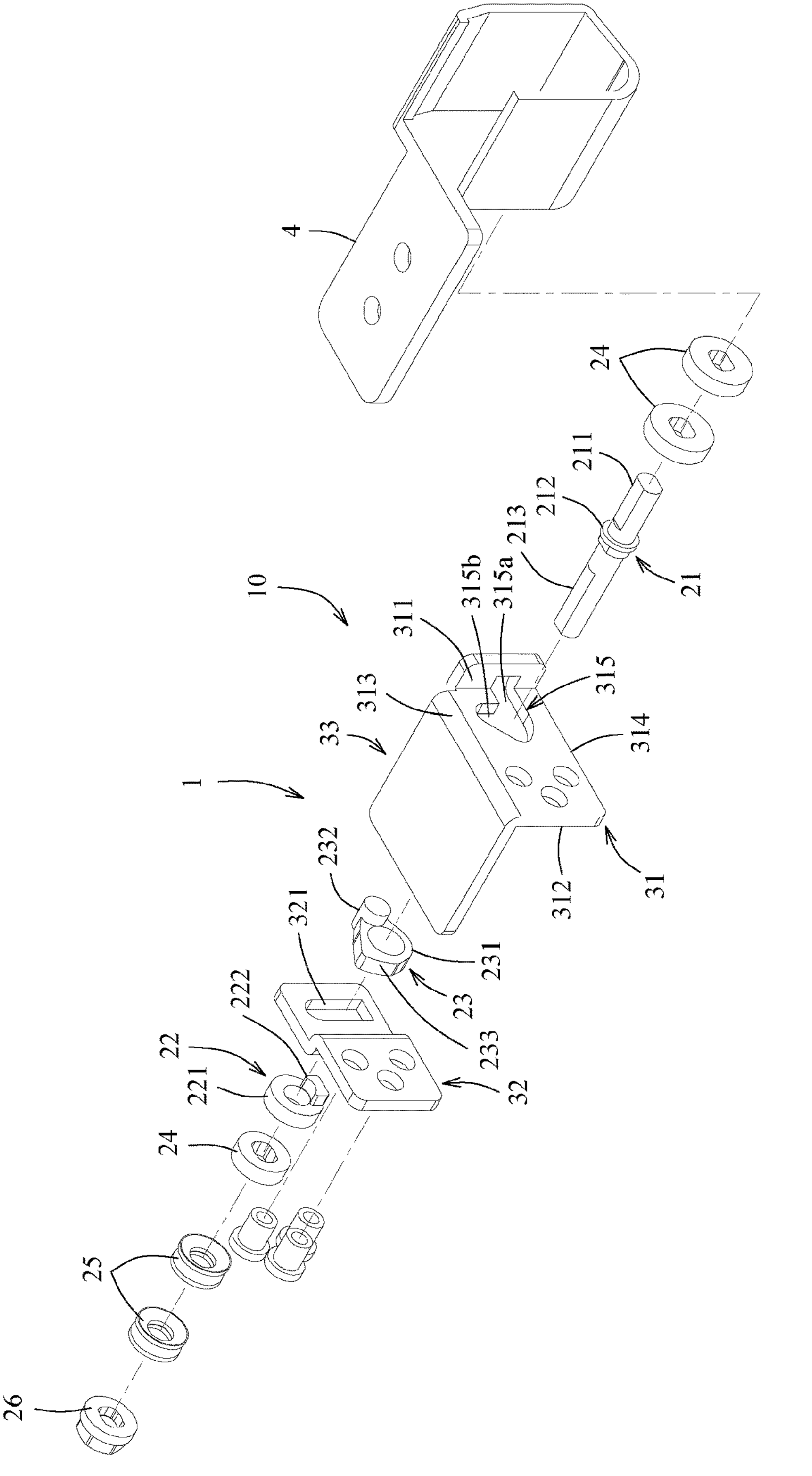
FIG. 5 is an exploded perspective view of the embodiment.

With reference to FIGS. 4 and 5, the base seat unit 1 includes a first base seat 3 for connecting with the first device part 20, and a second base seat 4 for connecting with the second device part 30. The first base seat 3 has a first base plate 31, a second base plate 32 connected with the first base plate 31, and a connecting plate 33. The first base plate

Figure 6:
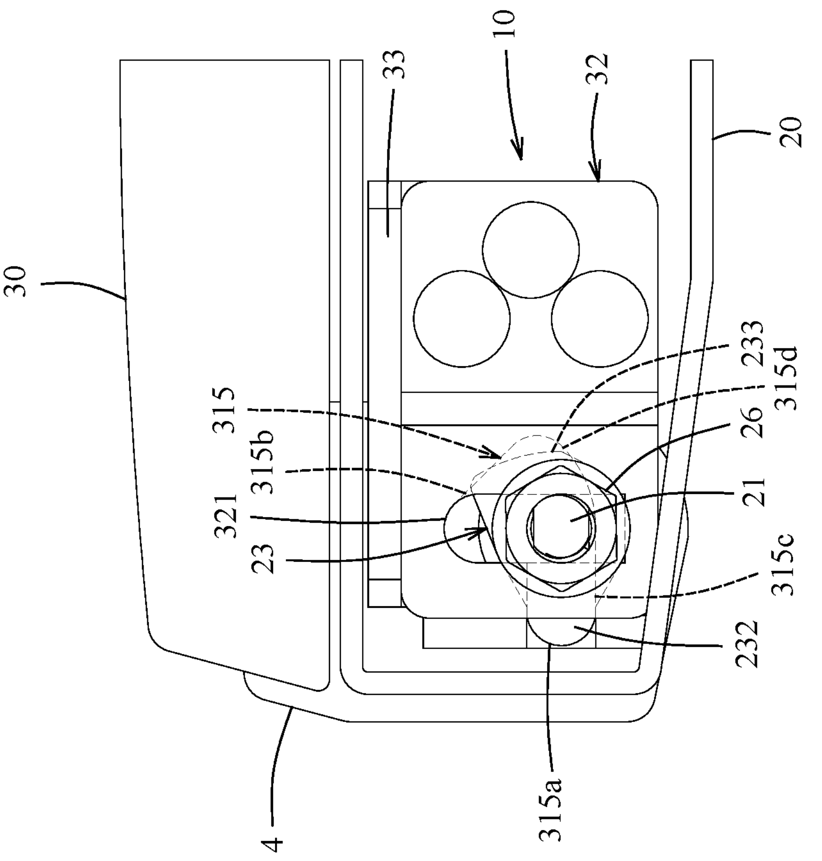
FIGS. 6 and 7 are a left side view and a right side view of the embodiment, illustrating the rotating unit in the initial position.

31 has a first side 311, a second side 312 opposite to the first side 311, an upper side 313 and a lower side 314 opposite to the upper side 313. The first base plate 31 is formed with a moving slot 315 in a major plate wall thereof. The moving slot 315 has a first slot portion (315*a*) which extends from the first side 311 toward the second side 312, and a second slot portion (315*b*) which is in communication with the first slot portion (315*a*) and which extends upwardly from the first slot portion (315*a*) toward the upper side 313. Referring to FIG. 6, a lower edge of the first slot portion (315*a*) has a horizontal surface (315*c*) which extends horizontally from the first side 311, and an upward curved surface (315*d*) which extends from the horizontal surface (315*c*) and is curved upwardly to border a distal end of the first slot portion (315*a*) that is remote from the first side 311. The second base plate 32 has a guide slot 321 formed in a major plate wall thereof. The guide slot 321 extends in an up-down direction and is aligned with the second slot portion (315*b*) of the moving slot 315. The connecting plate 33 is integrally formed and connected with the upper side 313 of the first base plate 31 and extends horizontally for connecting with the first device part 20.

The rotating unit 2 includes a rotating axle 21 which movably extends through the moving slot 315 of the first base plate 31 and the guide slot 321 of the second base plate 32 and which is securely connected with the second base seat 4 so as to be rotated with the second base seat 4, a guiding piece 22 which is sleeved on the rotating axle 21 and which is movably disposed in the guide slot 321, a cam piece 23 which is securely mounted on the rotating axle 21, three washers 24 which are securely sleeved on the rotating axle 21, two torsion discs 25 which are movably sleeved on the rotating axle 21, and a fastener 26 which is engaged with the rotating axle 21 and which abuts against one of the torsion discs 25. The rotating axle 21 has a first extending section 211 which extends through two of the washers 24 and which is in spine engagement with the second base seat 4 to permit rotation with the second base seat 4, a connecting section 212 which extends from the first extending section 211 and on which the cam piece 23 is sleeved, a second extending section 213 which extends from the connecting section 212 to extend through the guiding piece 22 and the other one of the washers 24. The guiding piece 22 includes a collar 221 which is sleeved on the rotating axle 21, and a guiding block 222 which is connected with and extends from the collar 221 and which is inserted into the guide slot 321 to be moved in the up-down direction along the guide slot 321. The second base plate 32 cooperates with the first base plate 31 to grip the cam piece 23. The cam piece 23 has a cam surrounding portion 231 which is securely sleeved on the rotating axle 21, a first protrusion 232 which projects radially from the cam surrounding portion 231 and which is movably disposed in the first slot portion (315*a*), and a second protrusion 233 which projects radially from the cam surrounding portion 231 and which is angularly spaced apart from the first protrusion 232. The two washers 24 abut against the first base plate 31 and the second base seat 4, respectively, and the other washer 24 is in abutting engagement with the guiding piece 22 and the adjacent torsion disc 25. One end of the torsion discs 25 abuts against the washer 24, and the opposite end thereof abuts against the fastener 26. Frictional forces are generated between the torsion discs 25 and the washer 24 and between the torsion discs 25 and the fastener 26, that produces a frictional torque during operation of the hinge 10.

Figure 7:
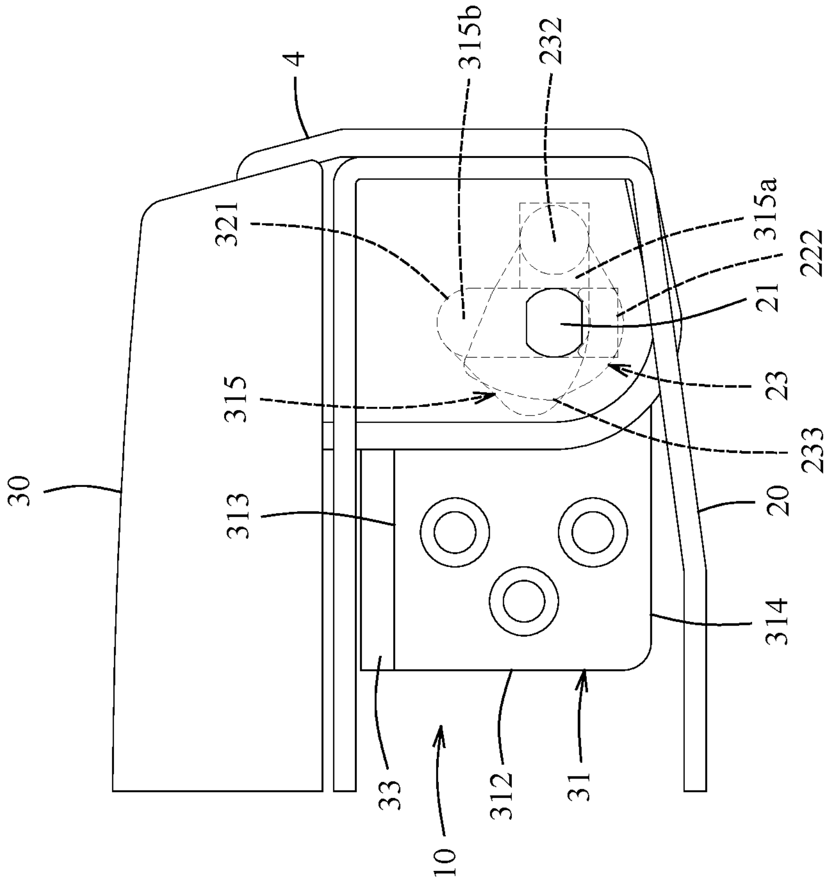
Figure 8:
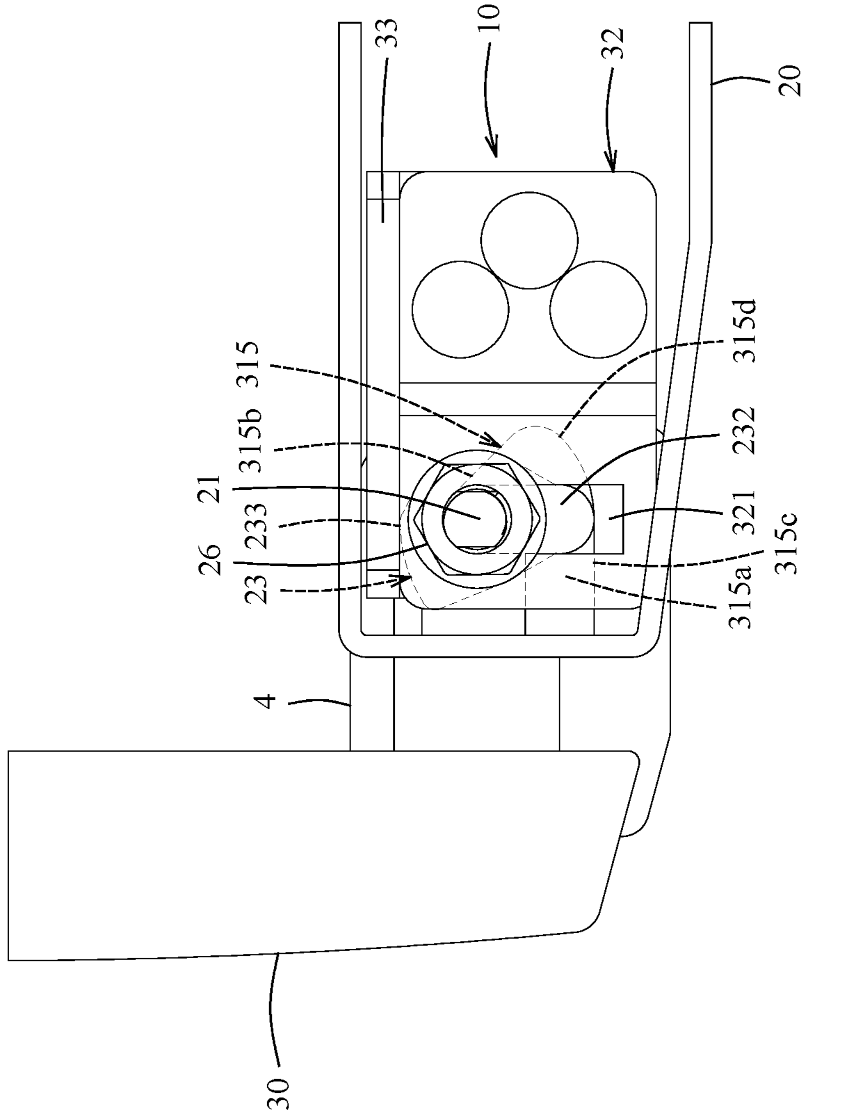
FIGS. 8 and 9 are a left side view and a right side view of the embodiment, illustrating the rotating unit in the first rotating position.
Figure 9:
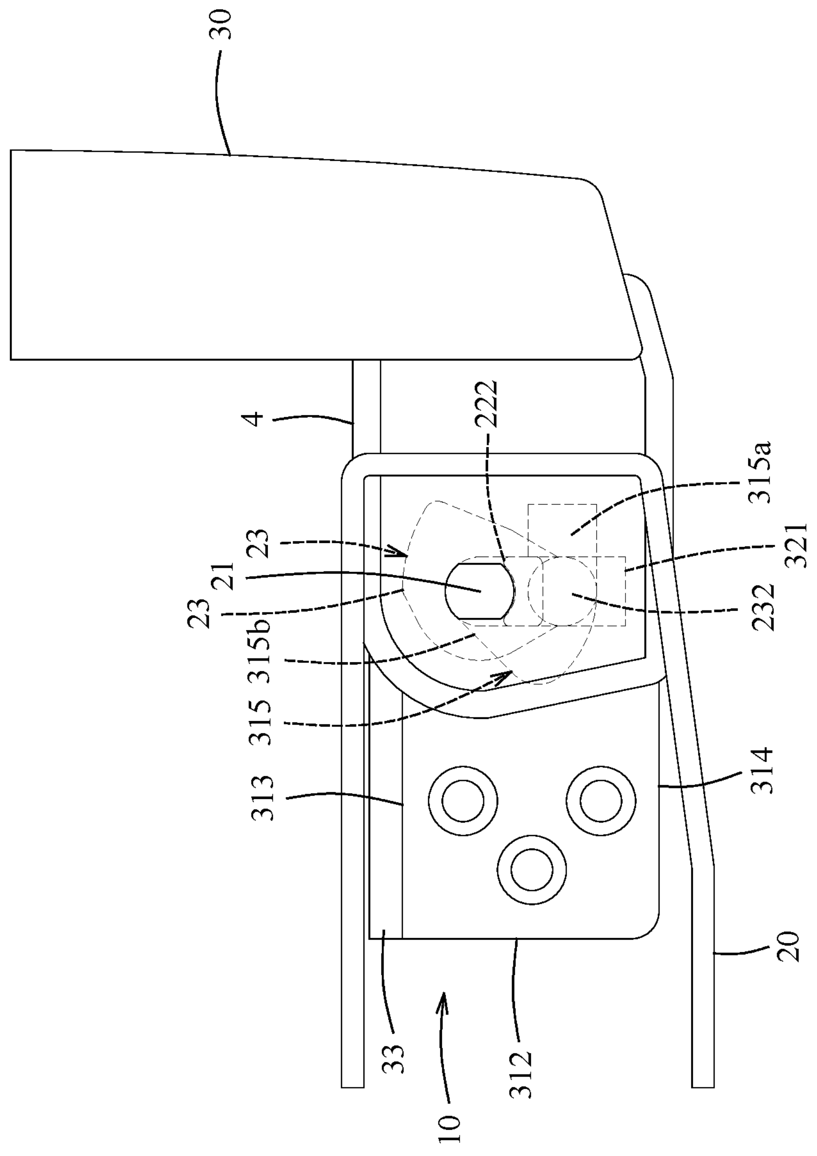
Figure 10:
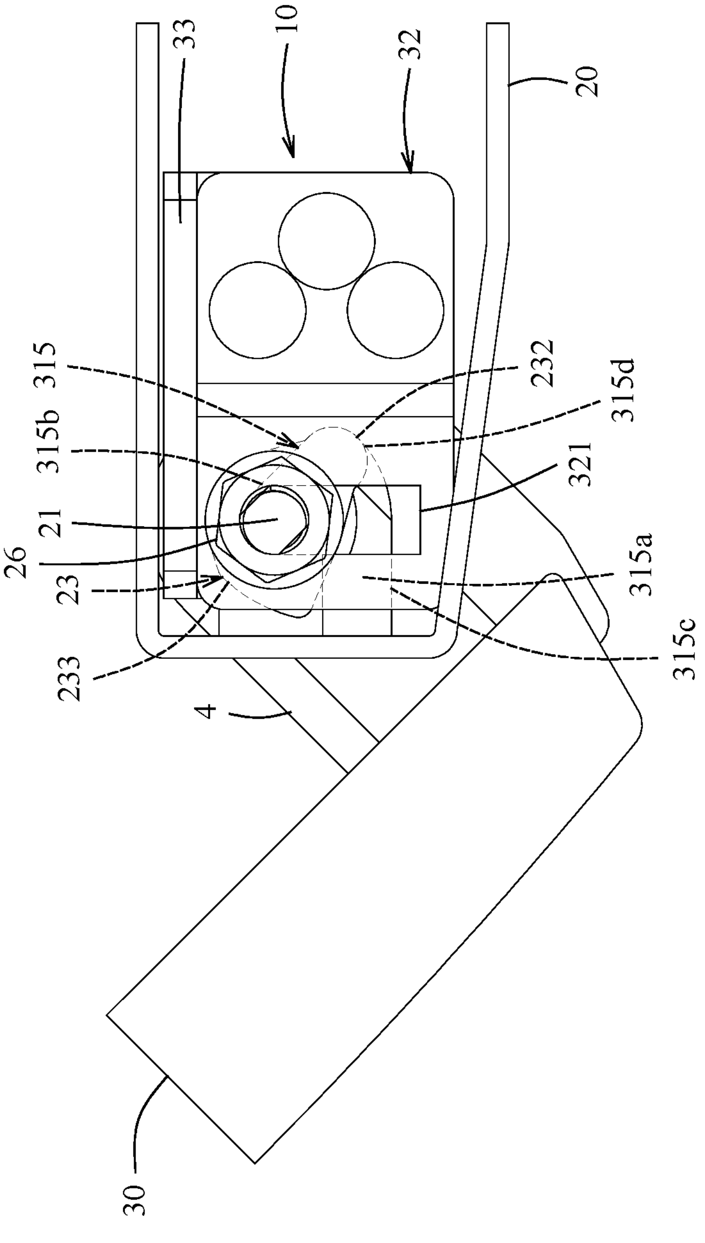
FIGS. 10 and 11 are a left side view and a right side view of the embodiment, illustrating the rotating unit in the second rotating position.
Figure 11:
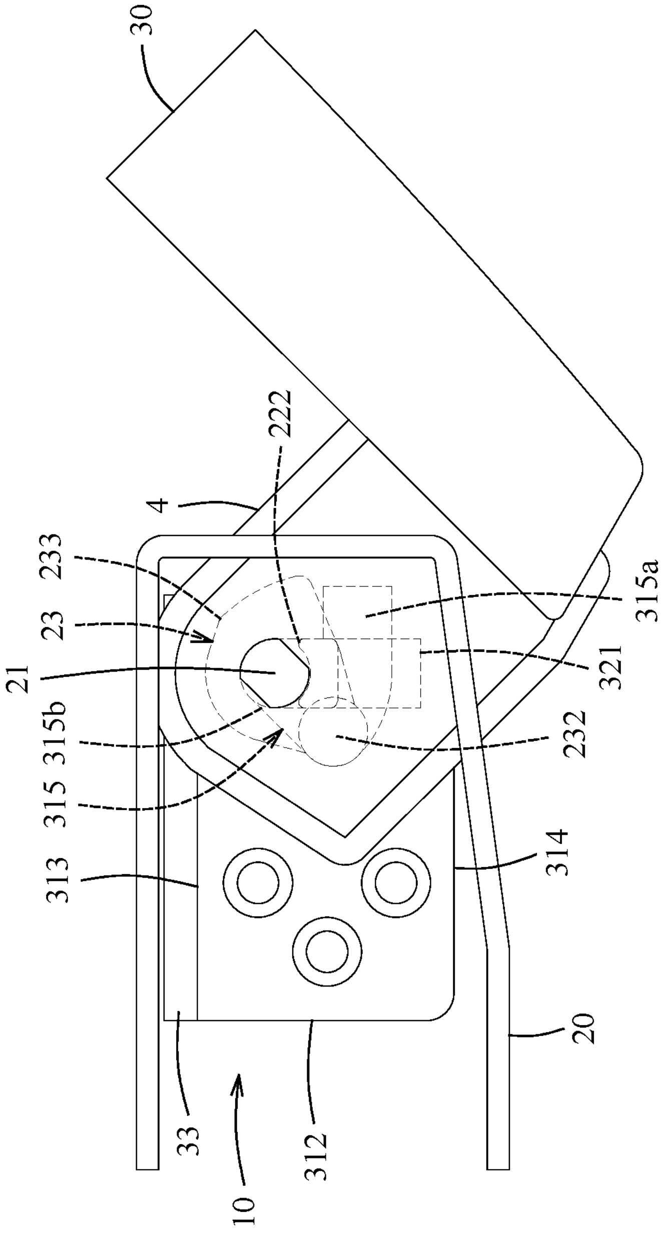

With reference to FIGS. 6 to 11, the second base seat 4 is driven to rotate the rotating unit 2 among an initial position, a first rotating position and a second rotating position. In the initial position, as shown in FIGS. 6 and 7, the rotating axle 21 is located in the first slot portion (315*a*), the first protrusion 232 of the cam piece 23 is located in the first slot portion (315*a*) adjacent to the first side 311 (i.e., at the horizontal surface (315*c*)). When it is desired to use the electronic device 100, the second device part 30 is opened relative to the first device part 20 to rotate the second base seat 4 along with the rotating axle 21 and the cam piece 23. During the rotation of the rotating axle 21 and the cam piece 23, the first protrusion 232 of the cam piece 23 abuts against and is moved along the lower edge of the first slot portion (315*a*) from the horizontal surface (315*c*) to the upward curved surface (315*d*) to bring the rotating axle 21 into upward movement to the second slot portion (315*b*) and bring the guiding piece 222 into upward movement along the guide slot 321, and the second protrusion 233 is in abutting engagement with the connecting plate 33 so as to move the rotating unit 2 to the first rotating position, as shown in FIGS. 8 and 9. At this stage, the rotating axle 21 is raised to create more clearance between the second device part 30 and the first device part 20. Thus, interfering of the second device part 30 with the first device part 20 during rotation is avoided, and the clearance facilitates heat dissipation with the heat dissipating holes 201 (see FIG. 2) of the first device part 20. Also, with the second protrusion 233 in abutting engagement with the connecting plate 33 and the guiding piece 222 moved upwardly along the guide slot 321, the rotating unit 2 is raised steadily during rotation without deflection. The second device part 30 can be further opened relative to the first device part 20 with a larger angle to rotate the second base seat 4 so as to move the rotating unit 2 to the second rotating position. When the rotating unit 2 is moved to the second rotating position from the first rotating position, the rotating axle 21 is kept in the second slot portion (315*b*), and the first protrusion 232 is located in the distal end of the first slot portion (315*a*) (i.e., at the upward curved surface (315*d*)) so as to restrict further rotation of the second base seat 4 and the second device part 30, as shown in FIGS. 10 and 11.

As illustrated, with the second base seat 4 driven to rotate with the rotating axle 21 and the cam piece 23, and with the first protrusion 232 of the cam piece 23 abutting against and moved along the lower edge of the first slot portion (315*a*), the rotating axle 21 is moved upwardly to the second slot portion (315*b*) to move the rotating unit 2 to the first rotating position. At this stage, the rotating axle 21 is raised to generate a height difference between the second device part 30 and the first device part 20 so as to create more clearance therebetween. Thus, interference of the second device part 30 with the first device part 20 during rotation is avoided.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hinge connectable between a first device part and a second device part to permit the second device part to rotate relative to the first device part, comprising:

a base seat unit including a first base seat for connecting with the first device part, and a second base seat for connecting with the second device part, said first base seat having a first base plate, said first base plate having a first side, a second side opposite to said first side, an upper side and a lower side opposite to said upper side, said first base plate being formed with a moving slot, said moving slot having a first slot portion which extends from said first side toward said second side, and a second slot portion which is in communication with said first slot portion and which extends from said first slot portion toward said upper side; and a rotating unit including a rotating axle which movably extends through said moving slot and which is securely connected with said second base seat so as to be rotated with said second base seat, and a cam piece which is securely mounted on said rotating axle, said cam piece having a cam surrounding portion which is securely sleeved on said rotating axle, and a first protrusion which projects radially from said cam surrounding portion and which is movably disposed in said first slot portion, wherein said second base seat is driven to rotate said rotating unit between an initial position, where said rotating axle is located in said first slot portion and said first protrusion of said cam piece is located in said first slot portion adjacent to said first side, and a first rotating position, and wherein, during rotation of said rotating axle and said cam piece with said second base seat, said first protrusion of said cam piece abuts against and is moved along a lower edge of said first slot portion to bring said rotating axle into upward movement to said second slot portion so as to move said rotating unit to the first rotating position.

2. The hinge of claim 1, wherein said first base seat further has a second base plate which is connected with said first base plate and cooperates with said first base plate to grip said cam piece.

3. The hinge of claim 2, wherein said second base plate has a guide slot which extends in an up-down direction and is aligned with said second slot portion of said moving slot and through which said rotating axle movably extends, said rotating unit further including a guiding piece which is sleeved on said rotating axle and movably disposed in said guide slot.

4. The hinge of claim 3, wherein said guiding piece includes a collar which is sleeved on said rotating axle, and a guiding block which is connected with and extends from said collar and which is inserted into said guide slot to be moved in the up-down direction along said guide slot.

5. The hinge of claim 2, wherein said rotating unit is further movable to a second rotating position, said first slot portion of said moving slot having a distal end which is remote from said first side and which is bordered by an upward curved surface, wherein, when said rotating unit is moved to the second rotating position from the first rotating position, said rotating axle is kept in said second slot portion and said first protrusion is located in said distal end of said first slot portion.

* * * * *